(12) United States Patent
Haverinen (10) Patent No.: US 8,942,628 B2
(45) Date of Patent: Jan. 27, 2015

(54) REDUCING POWER CONSUMPTION FOR CONNECTION ESTABLISHMENT IN NEAR FIELD COMMUNICATION SYSTEMS

(71) Applicant: Qualcomm Incorporated, San Diego, CA (US)

(72) Inventor: Anssi Kaleva Haverinen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 13/664,342

(22) Filed: Oct. 30, 2012

(65) Prior Publication Data

US 2013/0137371 A1 May 30, 2013

Related U.S. Application Data

(60) Provisional application No. 61/564,238, filed on Nov. 28, 2011.

(51) Int. Cl.
*H04B 7/00* (2006.01)

(52) U.S. Cl.
USPC .......................................................... 455/41.1

(58) Field of Classification Search
CPC ........................................................ H04B 5/00
USPC .......................................................... 455/41.1
See application file for complete search history.

(56) References Cited

U.S. PATENT DOCUMENTS

| | | | |
|---|---|---|---|
| 7,346,061 B2 | 3/2008 | Takayama et al. | |
| 7,711,323 B2 | 5/2010 | Fujii | |
| 7,899,393 B2 | 3/2011 | Luong | |
| 7,925,215 B2 | 4/2011 | Takayama | |
| 8,264,991 B2 | 9/2012 | Arunan | |
| 8,401,596 B2 * | 3/2013 | Takayama | 455/574 |
| 2004/0203389 A1 | 10/2004 | Kojima et al. | |

(Continued)

FOREIGN PATENT DOCUMENTS

| | | | |
|---|---|---|---|
| EP | 1798867 A2 | 6/2007 | |
| EP | 2205028 A2 | 7/2010 | |

(Continued)

OTHER PUBLICATIONS

International Search Report and Written Opinion—PCT/US2012/062747—ISA/EPO—Feb. 26, 2013.

(Continued)

*Primary Examiner* — April G Gonzales
(74) *Attorney, Agent, or Firm* — Mahamedi Paradice LLP (57) ABSTRACT

A method and apparatus for reducing power consumption associated with establishing a connection in a near field communication system is disclosed. According to some embodiments, when requesting an active mode NFC connection, the initiator device can selectively extend transmission of its NFC carrier signal by an extended period of time after transmitting a polling command to the target device. The extended period of time allows the target device additional time to stabilize its clock signal and transmit its own NFC carrier signal back to the initiator device. As a result, the initiator device may wait to enable its NFC clock generator until after receiving a polling command that requests the active mode NFC session. In this manner, when the initiator device requests a passive mode NFC connection, the target device may not enable its NFC clock generator, thereby reducing power consumption.

26 Claims, 5 Drawing Sheets

(56) References Cited

U.S. PATENT DOCUMENTS

| | | |
|---|---|---|
| 2006/0198364 A1* | 9/2006 | Fujii .................... 370/352 |
| 2008/0126560 A1 | 5/2008 | Takayama et al. |
| 2008/0291852 A1 | 11/2008 | Abel |
| 2010/0079261 A1 | 4/2010 | Goto et al. |
| 2010/0130127 A1* | 5/2010 | Takayama .............. 455/41.1 |
| 2011/0044396 A1* | 2/2011 | Fujii .................... 375/268 |
| 2011/0076945 A1 | 3/2011 | Chang et al. |
| 2012/0019674 A1 | 1/2012 | Ohnishi et al. |
| 2012/0164944 A1 | 6/2012 | Yamaoka et al. |
| 2012/0178367 A1 | 7/2012 | Matsumoto et al. |
| 2012/0231735 A1 | 9/2012 | Takayama et al. |
| 2012/0302166 A1 | 11/2012 | Yamaoka et al. |
| 2013/0137370 A1* | 5/2013 | Haverinen .............. 455/41.1 |
| 2013/0143492 A1 | 6/2013 | Takayama et al. |
| 2014/0200051 A1 | 7/2014 | Liu |

FOREIGN PATENT DOCUMENTS

| | | |
|---|---|---|
| JP | 2005210741 A | 8/2005 |
| JP | 2009-065514 A | 3/2009 |
| JP | 2010-130242 A | 6/2010 |
| WO | 2011058390 A1 | 5/2011 |

OTHER PUBLICATIONS

"Near Field Communication (NFC) IP-1; Interface and Protocol (NFCIP-1); ETSI TS 102 190", IEEE, LIS, Sophia Antipolis Cedex, France, vol. ECMATC32, No. V1.1.1, Mar. 1, 2003.

* cited by examiner

REDUCING POWER CONSUMPTION FOR CONNECTION ESTABLISHMENT IN NEAR FIELD COMMUNICATION SYSTEMS

CROSS-REFERENCE TO RELATED APPLICATIONS

This application claims the benefit under 35 USC 119(e) of the co-pending and commonly owned U.S. Provisional Application No. 61/564,238 entitled "REDUCING POWER CONSUMPTION FOR CONNECTION ESTABLISHMENT IN NEAR FIELD COMMUNICATION SYSTEMS" filed on Nov. 28, 2011, the entirety of which is incorporated by reference herein.

TECHNICAL FIELD

The present embodiments relate generally to near-field communications (NFC), and specifically to reducing power consumption during NFC data exchanges.

BACKGROUND OF RELATED ART

NFC technology allows for simplified wireless data exchanges between two NFC-enabled devices over a range of several centimeters or less. For example, an NFC-enabled mobile phone or a smart card having an NFC/RFID tag may exchange data with an NFC reader (e.g., in a point-of-sale terminal or another mobile device), thereby allowing a customer to purchase goods or services without exchanging hard currency or physically swiping a credit card. NFC technology may also be used to facilitate social networking, contact sharing, and/or establishing other wireless connections (e.g., Bluetooth or WiFi).

To establish an NFC connection between an initiator device and a target device, both devices follow a number of NFC standards. Examples of such NFC standards include ISO/IEC 18092 and ECMA-340 standards, which define modulation schemes, encoding and decoding schemes, transfer rates, frame format, transmission protocols, and so forth, for an NFC connection. More specifically, to initiate an NFC connection with the target device, the initiator device transmits an un-modulated radio frequency (RF) carrier signal for an active RF guard time (currently set to approximately 5 ms), and then modulates the carrier signal to embed a polling command (e.g., request frame) that requests either an active communication mode or a passive communication mode. If the initiator device requests the active communication mode, the initiator device terminates transmission of its carrier signal after transmitting the polling command, and then the target device transmits data to the initiator device by generating and modulating its own RF carrier signal. Conversely, if the initiator device requests the passive communication mode, the initiator device continues transmitting its carrier signal, and the target device transmits data to the initiator device by load modulating the initiator device's carrier signal. Thus, for the active communication mode, power consumption is shared between the initiator device and the target device, while for the passive communication mode, the target device consumes very little (if any) power because it does not generate its own carrier signal.

More specifically, when the initiator device requests the active communication mode in its polling command, the target device is to generate and transmit its own carrier signal no later than a predetermined response time after the initiator device terminates its carrier signal transmission. Currently, the predetermined response time for active mode communications, which is sometimes referred to as the active delay time ($T_{ADT}$), is set at 302 μs by the ISO 18092 standards. As mentioned above, the initiator device typically terminates its carrier signal immediately after transmitting the polling command to the target device, for example, so that the initiator device can receive data transmitted from the target device via the target device's own carrier signal. Because many clock generators take much longer than 302 μs to generate and stabilize a clock signal suitable for generating and modulating an NFC carrier signal, the target device typically enables its clock generator immediately after detecting the initial un-modulated carrier signal transmitted from the initiator device and/or generates its own carrier signal only after determining that the initiator device has terminated its carrier signal. In this manner, the target device may have sufficient time to enable its clock generator, stabilize its clock signal, and transmit its own carrier signal within the active delay time ($T_{ADT}$). However, if the target device enables its clock generator prematurely or unnecessarily, power consumption may be unnecessarily consumed. For example, if the initiator device subsequently requests the passive communication mode (e.g., after transmitting its un-modulated carrier signal for the active RF guard time (5 ms)), then the target device does not need to generate and transmit its own carrier signal). This unnecessary power consumption is of particular concern when the target device is a mobile device having a limited power supply (e.g., a smartphone powered by a small battery.

Accordingly, there is a need to reduce power consumption associated with establishing an NFC connection between NFC-enabled devices.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A method and apparatus are disclosed that reduce power consumption associated with establishing an NFC connection between an NFC initiator device and an NFC target device. In accordance with the present embodiments, the initiator device may selectively extend the transmission of its carrier signal by an extended time period when requesting an active mode NFC connection with the target device, thereby allowing the target device additional time to enable its clock generator and/or stabilize the clock signal used to generate and transmit its own carrier signal. As a result, the target device may selectively enable its clock generator after receiving and decoding the polling command from the initiator device (e.g., rather than automatically enabling its clock generator upon detecting the initial un-modulated carrier signal transmission from the initiator device).

More specifically, for some embodiments, if the initiator device requests an active mode NFC connection, the initiator device continues transmitting its carrier signal for an extended time period after sending the polling command to the target device (e.g., after modulating a request onto the carrier signal). For some embodiments, the extended time period may be referred to as an active RF extended time. In response to the request for the active mode NFC connection, the target device enables its clock generator to generate its clock signal and thereafter transmit its own carrier signal to the initiator device. The extended time period provided by the initiator device allows the target device sufficient time to stabilize its clock signal and to transmit its own carrier signal within the active mode response time (e.g., 302 μs). Conversely, if the polling command requests a passive mode NFC connection, the target device does not enable its clock generator and does not generate its own carrier signal, thereby reducing power consumption in the target device. For some embodiments, the initiator device includes a look-up table to store one or more values indicating the extended time period. For at least one embodiment, the initiator device may select a suitable value for the extended time period in response to one or more operating conditions (e.g., interference conditions, an expected distance between the initiator device and the target device, and so on) and/or characteristics of the target device (e.g., type of clock generator, battery type, and so on).

BRIEF DESCRIPTION OF THE DRAWINGS

The present embodiments are illustrated by way of example and are not intended to be limited by the figures of the accompanying drawings, where.

Like reference numerals refer to corresponding parts throughout the drawing figures.

DETAILED DESCRIPTION

The present embodiments are discussed below in the context of establishing a near field communication (NFC) connection between two NFC-enabled devices. It is to be understood that the present embodiments are equally applicable to other wireless communication technologies and/or standards. In the following description, numerous specific details are set forth such as examples of specific components, circuits, software and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. The term "NFC" as used herein refers to various communications governed by various NFC protocols including, for example, ISO/IEC 18092, ECMA-340, and/or standards defined by the NFC Forum. The term "NFC clock generator" as used herein refers to a clock generator that generates a clock signal to be used for generating, transmitting, and/or modulating an NFC carrier signal for exchanging data during an NFC connection.

In addition, as used herein, the term "initiator device" refers to an NFC-enabled device that initiates an NFC connection (e.g., by transmitting a polling command to another NFC-enabled device), and the term "target device" refers to an NFC-enabled device that responds to a request from the initiator device (e.g., either by transmitting its own carrier signal in response to a request for an active mode NFC connection or by load modulating the initiator device's carrier signal in response to a request for a passive mode NFC connection).

Figure 1:
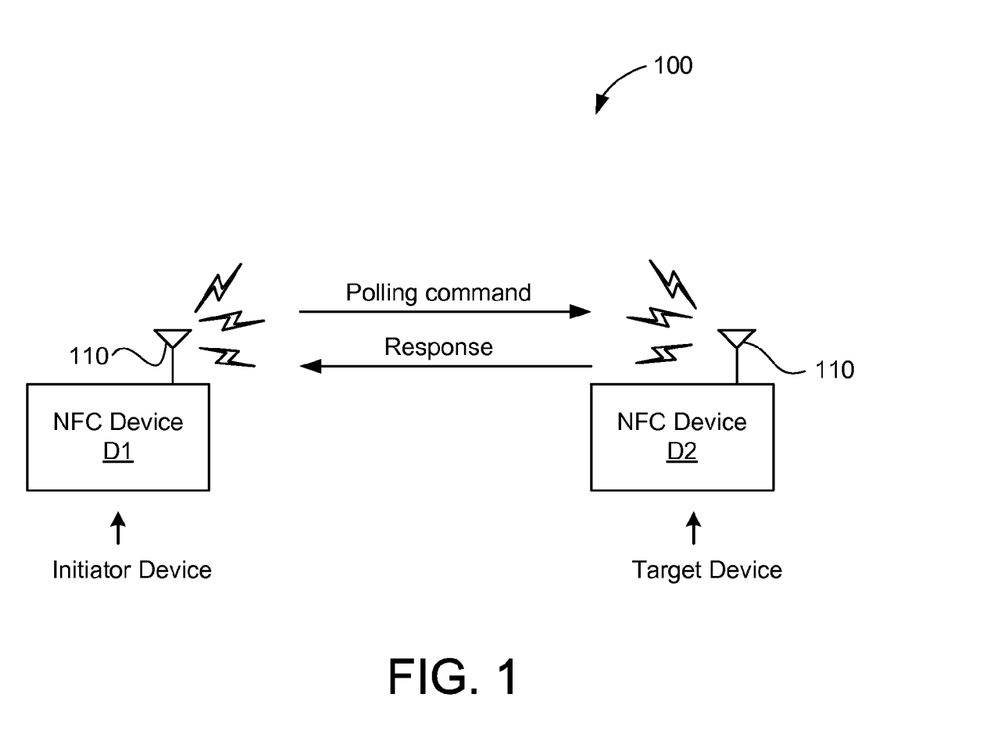
FIG. 1 is a block diagram of an NFC system that includes two NFC-enabled devices in accordance with some embodiments.

FIG. 1 shows an NFC system 100 that includes two NFC-enabled devices D1 and D2 in accordance with some embodiments. NFC devices D1 and D2 are each equipped with an NFC antenna 110 capable of exchanging wireless communication signals in the near field with other NFC antennas in other NFC devices. When the antennas 110 of the NFC devices D1 and D2 are brought near each other (e.g., within a few centimeters of each other), they become inductively coupled; once inductively coupled, they allow the NFC devices D1 and D2 to perform near-field communication with each other. In some embodiments, the antennas 110 are loop antennas that allow for radio frequency (RF) transmission and reception, although other well-known antennas can be used. For some embodiments, near-field communication between the NFC devices D1 and D2 is performed in accordance with one or more standards (e.g., ISO/IEC 18092, ECMA-340, and/or standards defined by the NFC Forum).

NFC devices D1 and D2 may be any suitable devices that can communicate with each other wirelessly according to NFC protocols or standards. For example, in some embodiments, both NFC devices D1 and D2 are mobile devices (e.g., cellular phones, personal digital assistants, or other mobile devices). In other embodiments, NFC device D1 is a mobile device and NFC device D2 is an NFC tag (e.g., a passive radio-frequency identification (RFID) tag). In still other embodiments, NFC device D1 is an NFC reader situated, for example, in a kiosk or admissions gate, and NFC device D2 is a mobile device or NFC tag. In some embodiments, NFC device D1 is a proximity coupling device (PCD) and NFC device D2 is a proximity integrated circuit card (PICC) (e.g., a contactless smart card).

For the exemplary embodiments described below, NFC device D1 is designated as the initiator device, and NFC device D2 is designated as the target device (as depicted in FIG. 1). For other embodiments, NFC device D1 may operate as the target device, and NFC device D2 may operate as the initiator device.

Figure 2:
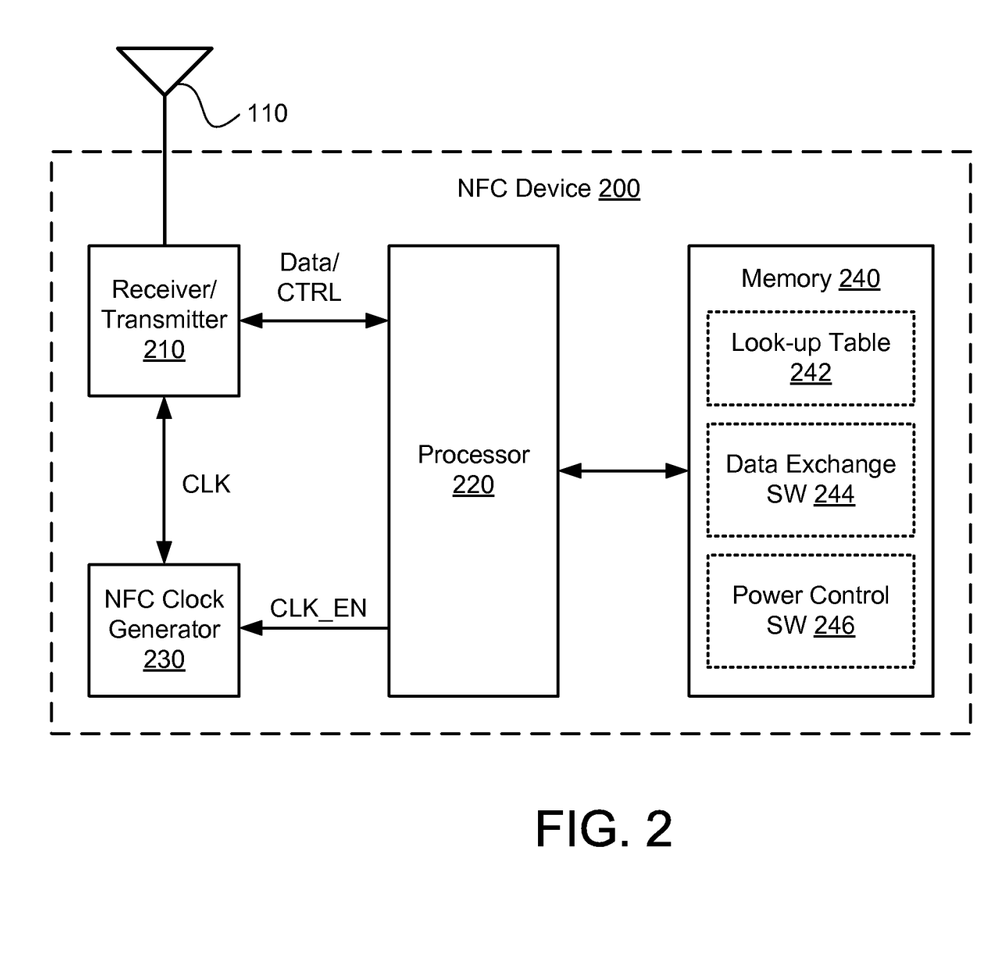
FIG. 2 is a block diagram of an NFC device in accordance with some embodiments.

FIG. 2 shows an NFC device 200 that is one embodiment of NFC device D1 and/or NFC device D2 of FIG. 1. NFC device 200 includes a well-known receiver/transmitter circuit 210, a processor 220, an NFC clock generator 230, and a memory 240. The receiver/transmitter circuit 210, which is coupled to antenna 110, to processor 220, and to NFC clock generator 230, may be used to transmit signals to and receive signals from another NFC-enabled device. More specifically, receiver/transmitter circuit 210 receives a clock signal CLK from NFC clock generator 230, and exchanges data and control signals (CTRL) with processor 220. In operation, receiver/transmitter circuit 210 may be used to generate and/or modulate data onto a carrier signal to be transmitted to another device via antenna 110, and may be used to receive and demodulate data from a carrier signal received by antenna 110. For some embodiments, receiver/transmitter circuit 210 may also be used to load modulate data onto a carrier signal transmitted from another device (e.g., when communicating in the NFC passive mode).

NFC clock generator 230 can be any suitable type of clock generator or clock circuit that generates a clock signal such as CLK suitable for use in generating an NFC carrier signal and/or modulating data onto the NFC carrier signal. For example, NFC clock generator 230 may be a voltage-controlled oscillator, a crystal oscillator, or a digital clock generator. Further, while the exemplary embodiment of FIG. 2 depicts NFC clock generator 230 as a dedicated or standalone clock generator for providing the clock signal CLK to receiver/transmitter 210, for other embodiments, clock generator 230 may be shared with other resources or modules on NFC device 200. Thus, for at least one embodiment, NFC clock generator 230 may be implemented within another circuit or module of NFC device 200.

Memory 240, which is coupled to processor 220, may be any suitable memory element or device. Memory 240 may include a look-up table 242 that stores one or more values indicating an extended time period ($T_{EXT}$) associated with continuing transmission of the initiator device's NFC carrier signal after a polling command has been modulated onto the carrier signal. For some embodiments, the extended time period $T_{EXT}$ may be predetermined and programmed into table 242 (e.g., by a manufacturer of the initiator device). For other embodiments, the table 242 may store a plurality of extended time periods $T_{EXT}$ that can be dynamically selected when transmitting a polling command to the target device. For example, each of the plurality of extended time periods $T_{EXT}$ may be selected in response to one or more parameters including, for example, current operating conditions, predetermined environmental conditions, the type and/or operating characteristics of the target device's NFC clock generator or battery, and so on.

Figure 4A:
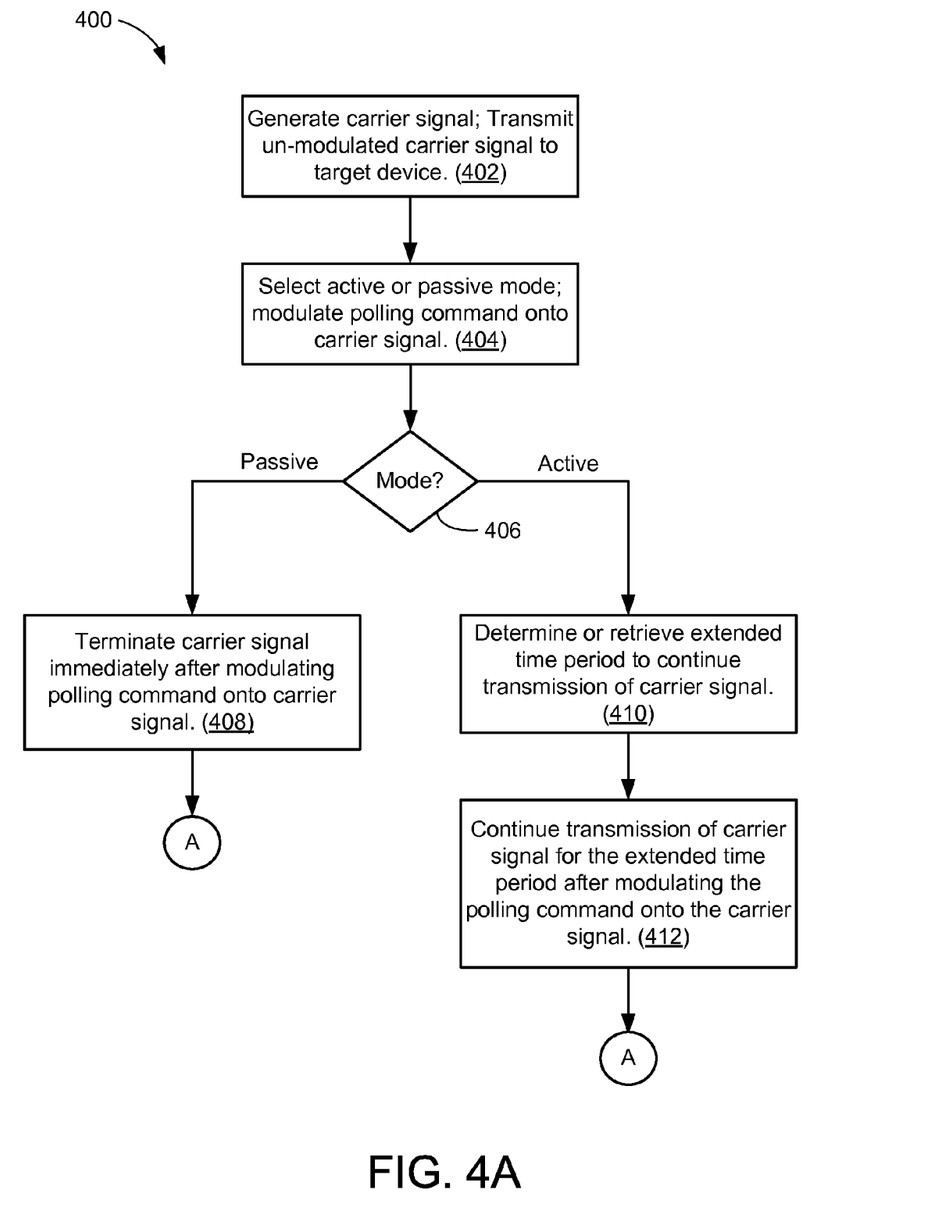
FIG. 4A is an illustrative flow chart depicting an exemplary operation for an NFC device operating as an initiator device in accordance with some embodiments.
Figure 4B:
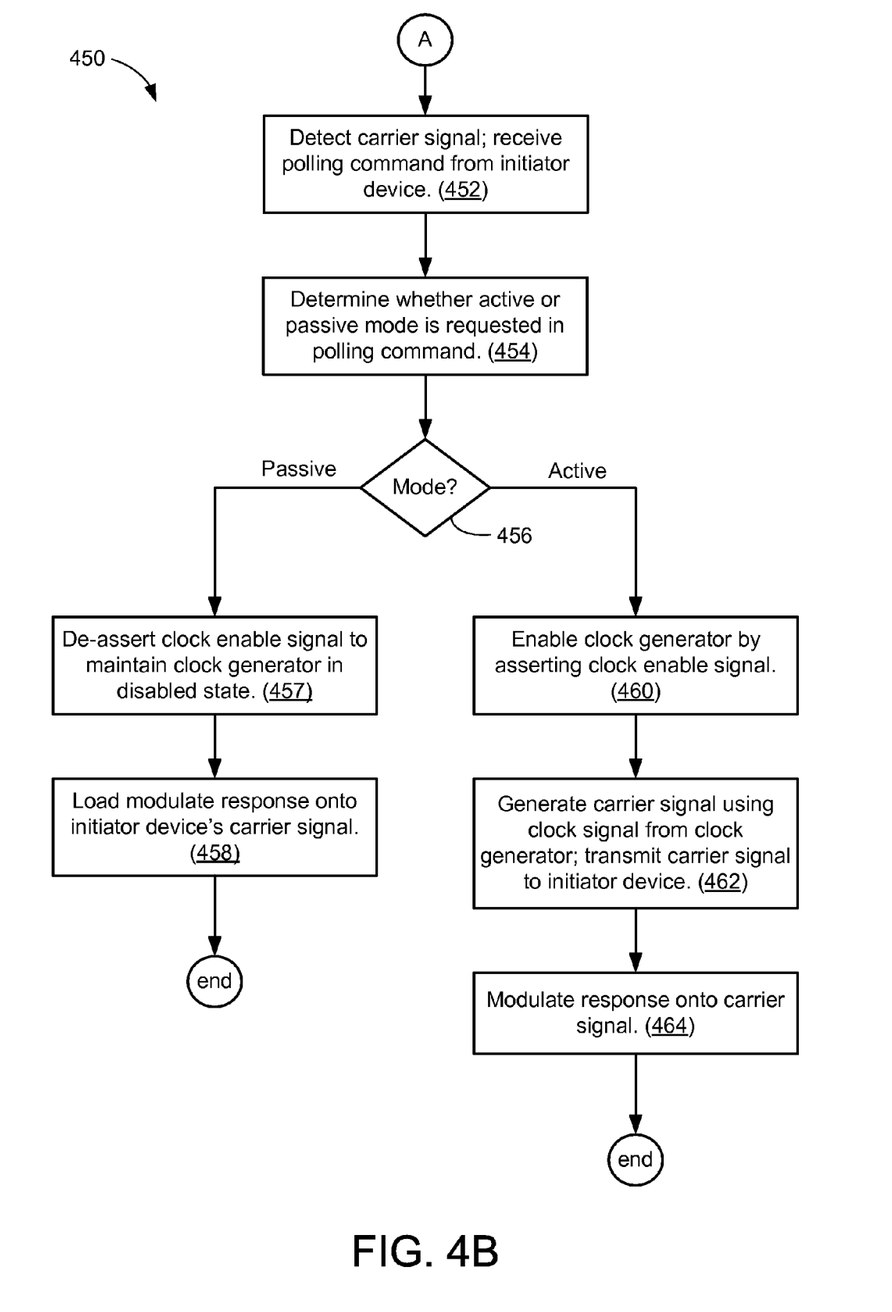
FIG. 4B is an illustrative flow chart depicting an exemplary operation for an NFC device operating as a target device in accordance with some embodiments.

Memory 240 may also include a non-transitory computer-readable medium (e.g., one or more nonvolatile memory elements, such as EPROM, EEPROM, Flash memory, a hard drive, and so on) that can store the following software modules:

a data exchange software module 244 to facilitate the generation of an NFC carrier signal suitable for NFC data exchanges and/or to modulate data onto the NFC carrier signal (e.g., polling commands, requests, responses, and data to be exchanged with another NFC device) for example, as described for operations 402, 404, 408, 410, and/or 412 of FIG. 4A and operations 452, 454, 458, 462, and/or 464 of FIG. 4B; and a power control software module 246 to determine power conditions and/or selectively enable and disable NFC clock generator 230 to reduce power consumption of NFC device 200, for example, as described for operations 457 and/or 460 of FIG. 4B.

The data exchange software module 244 includes instructions that, when executed by processor 220, can cause NFC device 200 to perform the corresponding functions. The power control software module 246 includes instructions that, when executed by processor 220, can cause NFC device 200 to perform the corresponding functions.

Processor 220, which is coupled to receiver/transmitter circuit 210, NFC clock generator 230, and memory 240, can be any suitable processor capable of executing scripts or instructions of one or more software programs stored in NFC device 200 (e.g., within memory 240). For example, processor 220 can execute data exchange software module 244 to facilitate the generation of the NFC carrier signal and/or to modulate data onto the NFC carrier signal. Processor 220 can also execute power control software module 246 to determine power conditions and/or selectively enable and disable NFC clock generator 230 to reduce power consumption of NFC device 200.

During the execution of one or more of the software modules stored in memory 240, processor 220 may send data and/or control signals to receiver/transmitter 210, may receive data and/or control signals from receiver/transmitter 210, and may provide a clock enable signal CLK_EN to NFC clock generator 230. More specifically, processor 220 may selectively assert CLK_EN to enable NFC clock generator 230 to generate and stabilize the clock signal CLK in response to determining that a polling command received from another NFC device is requesting an active communication mode, as described in more detail below. Processor 220 may also selectively de-assert CLK_EN to disable NFC clock generator 230 from generating the clock signal CLK when the other NFC device is requesting a passive communication mode (e.g., to reduce power consumption).

Although NFC device 200 may be used as either the initiator device D1 or the target device D2 in the present embodiments, it is noted that one or more elements of NFC device 200 may be omitted depending upon whether NFC device 200 is used as the initiator device D1 or the target device D2. For one example, when NFC device 200 is used as the initiator device D1 of FIG. 1, power control software module 246 may be omitted. For another example, when NFC device 200 is used as the target device D2 of FIG. 2, look-up table 242 may be omitted.

As mentioned above, when establishing an NFC connection or link between initiator device D1 and target device D2, the initiator device D1 may request either an active mode NFC connection or a passive mode NFC connection (e.g., by embedding the request into a polling command modulated onto the initiator device's carrier signal). In the active mode NFC connection, the initiator device D1 and the target device D2 each generate their own carrier signals and transmit data to other device by modulating data onto their own carrier signals (e.g., during alternating time period or slots). Conversely, in the passive mode NFC connection, only the initiator device D1 generates and transmits its own carrier signal; the target device D2 sends data (e.g., a response to the polling command) to the initiator device by load modulating the initiator device's carrier signal.

Thus, while power consumption may be shared between the initiator device D1 and target device D2 during active mode NFC connections, most (if not all) of the power consumption is attributed to the initiator device D1 during passive mode NFC connections. As a result, the passive mode NFC connection is suitable for use in environments where the target device D2 has a limited power supply (e.g., when a person uses an NFC-enabled smartphone to purchase goods at a store or restaurant). One of the reasons that the target device D2 consumes little (if any) power during the passive mode NFC connection is because the target device D2 does not have to enable and operate its own clock generator, and does not have to generate and transmit its own carrier signal.

According to current NFC standards, when the initiator device D1 requests the active mode NFC connection (e.g., as indicated in the polling command sent to the target device), the target device D2 is to begin transmission of its own carrier signal no later than 302 µs (e.g., the active delay time $T_{ADT}$) after the initiator device D1 terminates transmission of its own carrier signal. Thus, in a successful NFC connection, there can be no more than a 302 µs time delay between carrier signal transmissions from the initiator device D1 and the target device D2. However, as mentioned above, many clock generators (e.g., clock generator 230 of FIG. 2) take much longer than 302 µs to generate and stabilize the clock signal to be used for generating the NFC carrier signal. For example, clock generators implemented using voltage-controlled oscillators (VCOs) typically need three or more milliseconds after being enabled to stabilize the NFC carrier signal clock. Moreover, even more sophisticated clock generators such as crystal oscillators dedicated for generating NFC carrier signals may take as much as 1.5 milliseconds to stabilize the NFC carrier signal clock after being enabled.

As a result, a conventional NFC target device typically maintains its NFC clock generator in an enabled state in case it needs to generate and transmit its own carrier signal (e.g., for active mode NFC connections) within the 302 μs time period (e.g., as provided by the active delay time $T_{ADT}$). Although maintaining the target device's clock generator in an enabled state may result in unnecessary power consumption (e.g., if the initiator device requests the passive mode there is no need for the target device to generate or transmit its own carrier signal), failure to stabilize the target device's NFC carrier signal clock before expiration of the 302 μs time period may preclude establishing a successful NFC connection.

Thus, in accordance with the present embodiments, power consumption may be reduced in target device D2 by configuring target device D2 to enable its NFC clock generator 230 only in response to receiving a polling command that requests an active mode NFC connection. In this manner, target device D2 does not enable its NFC clock generator 230 or generate its own NFC carrier signal if initiator device D1 requests a passive mode NFC connection, thereby saving power consumption associated with enabling and operating its NFC clock generator 230 and/or transmitter portions of receiver/transmitter 210. In addition, by enabling its NFC clock generator 230 only after determining that initiator device D1 is requesting an active mode NFC connection, target device D2 does not prematurely enable its NFC clock generator 230, thereby further reducing power consumption in target device D2.

Further, to ensure that target device D2 is able to stabilize its NFC carrier signal clock and thereafter transmit its own NFC carrier signal within the 302 μs time period, the initiator device D1 may be configured to continue transmitting its carrier signal for an extended time period ($T_{EXT}$) after modulating the polling command onto its carrier signal. The extended time period $T_{EXT}$ may be any suitable value that allows target device D2 sufficient time to enable its NFC clock generator 230 in response to a request for an active mode NFC connection, to stabilize its NFC carrier signal clock, and to transmit its own NFC carrier signal to initiator device D1. For example, if initiator device D1 continues transmitting its NFC carrier signal for 7 ms after sending a request for an active mode NFC connection to target device D2, target device D2 may wait to enable its NFC clock generator 230 until after decoding the polling command and yet still be able to transmit its own NFC carrier signal back to the initiator device D1 within the 302 μs time period.

Figure 3:
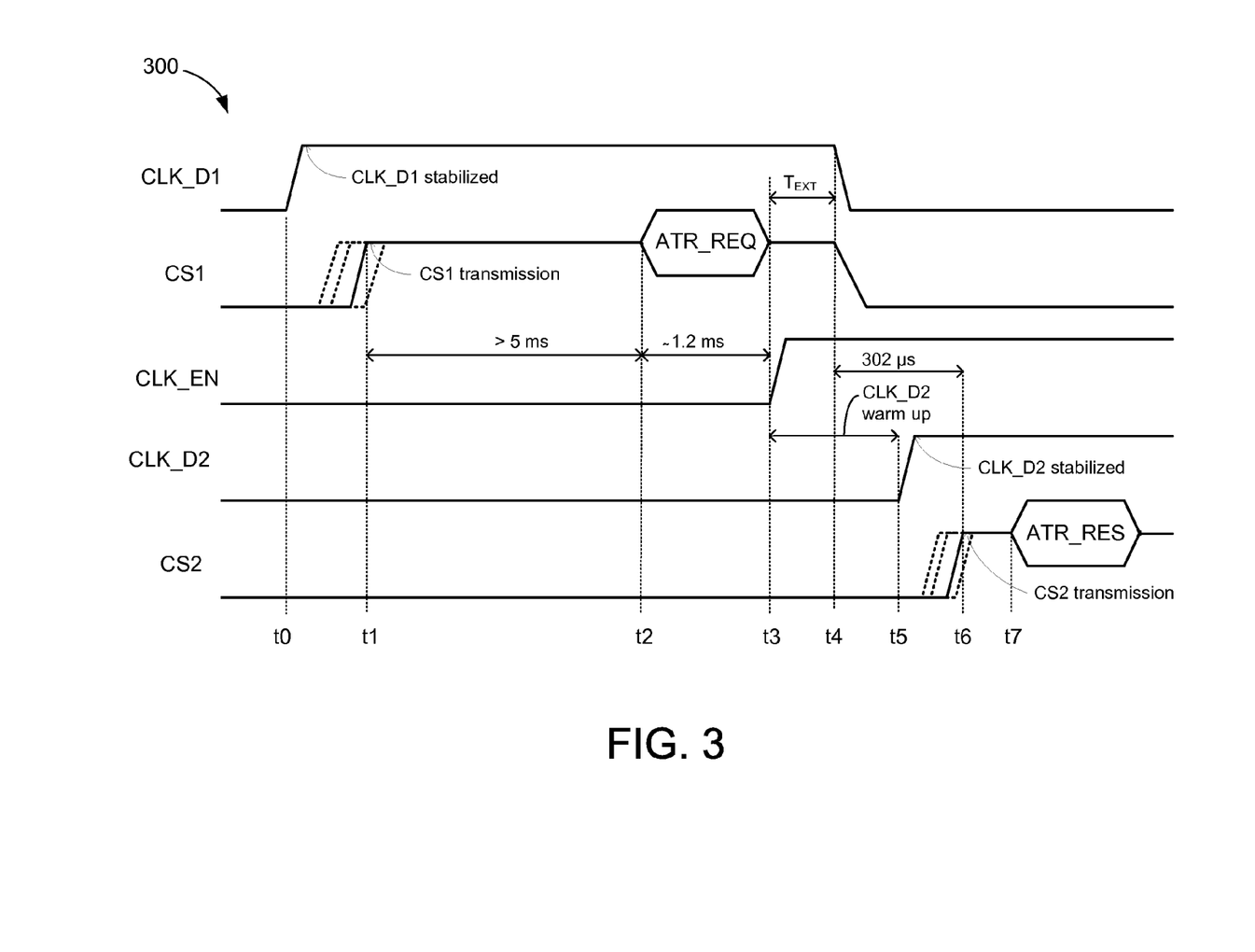
FIG. 3 is an exemplary timing diagram depicting NFC signal transmissions between an initiator device and a target device, in accordance with some embodiments.

An exemplary operation for establishing an active mode NFC connection between initiator device D1 and target device D2 is described below with respect to the illustrative timing diagram 300 of FIG. 3. Timing diagram 300 depicts waveforms for initiator device D1's carrier signal clock CLK_D1, a first NFC carrier signal CS1 transmitted from initiator device D1, a second NFC carrier signal CS2 transmitted from target device D2, the clock enable signal CLK_EN in target device D2, and target device D2's carrier signal clock CLK_D2.

First, initiator device D1 activates its NFC clock generator 230 at time t0. The initiator device D1's carrier signal clock CLK_D1 is stabilized by time t1, after which initiator device D1 transmits an un-modulated NFC carrier signal CS1 for 5 ms or more. At time t2, initiator device D1 modulates a polling command containing an attribute request frame (ATR_REQ) onto its NFC carrier signal CS1. By time t3, the polling command has been transmitted to target device D2.

In accordance with the present embodiments, after its polling command has been transmitted (e.g., after the last bit of the request frame ATR_REQ is modulated onto carrier signal CS1), initiator device D1 continues transmitting its NFC carrier signal CS1 for an extended time period ($T_{EXT}$) until time t4. In contrast, conventional initiator devices requesting an active mode NFC connection typically terminate transmission of their carrier signals immediately after transmitting the polling command (e.g., to reduce power consumption and/or to prepare for reception of the target device's NFC carrier signal).

At or before time t3, target device D2 receives the request frame (ATR_REQ) and determines that initiator device D1 is requesting an active mode NFC connection. In response thereto, target device D2 asserts (e.g., to logic high) its clock enable signal CLK_EN to enable its NFC clock generator 230. The target device D2's clock generator 230 warms up by time t5, and just after time t5 stabilizes its NFC carrier signal clock CLK_D2. Thus, after time t5, target device D2's clock signal CLK_D2 becomes available for use by its receiver/transmitter 210 to generate target device D2's NFC carrier signal CS2. Then, at or before time t6, target device D2 transmits its own NFC carrier signal CS2, and at time t7 target device D2 modulates an attribute response frame (ATR_RES) onto its NFC carrier signal CS2.

Note that initiator device D1 terminates its NFC carrier signal CS1 at time t4, which for the present embodiments triggers the beginning of the 302 μs time period during which target device D2 must transmit its own NFC carrier signal CS2 in response to initiator device D1's request frame. Because target device D2 asserted CLK_EN to enable its NFC clock generator 230 at time t3 (in response to decoding the polling command's request frame), target device D2 is able to stabilize its NFC carrier signal clock CLK_D2 and transmit its own NFC carrier signal CS2 before the expiration of the 302 μs time period at time t6.

FIGS. 4A and 4B are illustrative flow charts 400 and 450 depicting an exemplary operation for establishing an NFC connection between initiator device D1 and target device D2 in accordance with some embodiments. First, referring to FIG. 4A, initiator device D1 generates and transmits an un-modulated NFC carrier signal CS1 (402). Next, initiator device D1 selects either an active mode or a passive mode NFC connection, and modulates a polling command containing a request for the selected communication mode onto its NFC carrier signal CS1 (404). Thereafter, if the passive mode is selected, as tested at 406, initiator device D1 terminates transmission of its NFC carrier signal CS1 immediately after modulating the polling command onto NFC carrier signal CS1 (408). Conversely, if the active mode is selected, as tested at 406, initiator device D1 determines or retrieves the extended time period $T_{EXT}$ (e.g., from its memory 240) (410), and continues transmitting its NFC carrier signal CS1 for the extended time period $T_{EXT}$ after modulating the polling command onto NFC carrier signal CS1 (412).

Referring now to FIG. 4B, target device D2 detects initiator device D1's carrier signal CS1 and receives the polling command transmitted from initiator device D1 (452). Target device D2 decodes the request frame contained in the polling command and determines whether initiator device D1 is requesting an active mode or passive mode NFC connection (454). If initiator device D1 is requesting the passive mode NFC connection, as tested at 456, then target device D2 de-asserts its clock enable signal CLK_EN to maintain its NFC clock generator 230 in a disabled state (457), and thereafter responds to the polling command by load modulating the initiator device D1's carrier signal CS1 (458). Conversely, if initiator device D1 is requesting the active mode NFC connection, as tested at 456, then target device D2 enables its NFC clock generator 230 by asserting its clock enable signal CLK_EN (460). Next, target device D2 generates its own NFC carrier signal CS2 using the clock signal CLK_D2 provided by its NFC clock generator 230 and transmits the NFC carrier signal CS2 to initiator device D1 (462). Then, target device D2 responds to initiator device D1 by modulating a response frame (e.g., ATR_RES) onto its NFC carrier signal CS2 (464).

In the foregoing specification, the present embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of operating a target device to establish a near-field communication (NFC) connection with an initiator device, the method comprising:
   receiving a first carrier signal from the initiator device, wherein the first carrier signal includes a polling command;
   determining whether the polling command requests an active communication mode or a passive communication mode; and
   selectively enabling an NFC clock generator in the target device in response to the polling command.

2. The method of claim 1, wherein the NFC clock generator is, when enabled, to generate a clock signal associated with transmitting a second carrier signal from the target device.

3. The method of claim 1, wherein the selectively enabling comprises:
   maintaining the NFC clock generator in a disabled state when the polling command requests the passive communication mode; and
   enabling the NFC clock generator when the polling command requests the active communication mode.

4. The method of claim 3, wherein the target device is to enable the NFC clock generator only after decoding the polling command.

5. The method of claim 3, further comprising:
   transmitting a second carrier signal from the target device using a clock signal generated by the enabled NFC clock generator.

6. The method of claim 5, further comprising:
   modulating a response to the polling command onto the second carrier signal.

7. The method of claim 1, wherein the target device is to continue receiving the first carrier signal for an extended time period after receiving a request for the active communication mode, wherein the extended time period corresponds to an amount of time for the NFC clock generator to stabilize a clock signal.

8. A near-field communication (NFC) device, comprising:
   means for receiving a first carrier signal from an initiator device, wherein the first carrier signal includes a polling command;
   means for determining whether the polling command requests an active communication mode or a passive communication mode;
   means for maintaining an NFC clock generator in a disabled state when the polling command requests the passive communication mode; and
   means for enabling the NFC clock generator when the polling command requests the active communication mode.

9. The NFC device of claim 8, wherein the NFC clock generator is, when enabled, to generate a clock signal associated with transmitting a second carrier signal from the NFC device.

10. The NFC device of claim 8, wherein the NFC device is to enable the NFC clock generator only after decoding the polling command.

11. The NFC device of claim 8, further comprising:
    means for transmitting a second carrier signal from the NFC device using a clock signal generated by the enabled NFC clock generator.

12. The NFC device of claim 11, further comprising:
    means for modulating a response to the polling command onto the second carrier signal.

13. The NFC device of claim 8, wherein the NFC device is to continue receiving the first carrier signal for an extended time period after receiving a request for the active communication mode, wherein the extended time period corresponds to an amount of time for the NFC clock generator to stabilize a clock signal.

14. A non-transitory computer-readable medium containing program instructions that, when executed by a processor of a near-field communication (NFC) device, cause the NFC device to:
    receive a first carrier signal from an initiator device, wherein the first carrier signal includes a polling command that requests either an active communication mode or a passive communication mode; and
    selectively enable an NFC clock generator in response to decoding the polling command.

15. The non-transitory computer-readable medium of claim 14, wherein the NFC clock generator is, when enabled, to generate a clock signal associated with transmitting a second carrier signal from the NFC device.

16. The non-transitory computer-readable medium of claim 14, wherein execution of the program instructions to selectively enable the NFC clock generator causes the NFC device to:
    maintain the NFC clock generator in a disabled state when the polling command requests the passive communication mode; and
    enable the NFC clock generator when the polling command requests the active communication mode.

17. The non-transitory computer-readable medium of claim 16, wherein the NFC device is to enable the NFC clock generator only after decoding the polling command.

18. The non-transitory computer-readable medium of claim 16, wherein execution of the program instructions further cause the NFC device to:
    transmit a second carrier signal from the NFC device using a clock signal generated by the enabled NFC clock generator.

19. The non-transitory computer-readable medium of claim 18, wherein execution of the program instructions further cause the NFC device to:
    modulate a response to the polling command onto the second carrier signal.

20. The non-transitory computer-readable medium of claim 14, wherein execution of the program instructions further cause the NFC device to:
    continue receiving the first carrier signal for an extended time period after receiving a request for the active communication mode, wherein the extended time period corresponds to an amount of time for the NFC clock generator to stabilize a clock signal.

21. A near-field communication (NFC) device, comprising:
- a receiver to receive a first carrier signal from an initiator device, wherein the first carrier signal includes a polling command; and
- a processor to:
  - determine whether the polling command requests an active communication mode or a passive communication mode; and
  - selectively enable an NFC clock generator in the NFC device in response to the polling command.

22. The NFC device of claim 21, wherein the NFC clock generator is, when enabled, to generate a clock signal associated with transmitting a second carrier signal from the NFC device.

23. The NFC device of claim 21, wherein the processor is to selectively enable the NFC clock generator by:
- maintaining the NFC clock generator in a disabled state when the polling command requests the passive communication mode; and
- enabling the NFC clock generator when the polling command requests the active communication mode.

24. The NFC device of claim 23, wherein the processor is to enable the NFC clock generator only after decoding the polling command.

25. The NFC device of claim 23, wherein the processor is to further:
- transmit a second carrier signal from the NFC device using a clock signal generated by the enabled NFC clock generator.

26. The NFC device of claim 25, wherein the processor is to further:
- modulate a response to the polling command onto the second carrier signal.

\* \* \* \* \*